United States Patent [19]

Love

[11] Patent Number: 4,689,036

[45] Date of Patent: Aug. 25, 1987

[54] TORQUE-RESPONSIVE POWER TRANSMISSION ASSEMBLY

[75] Inventor: Mahlon L. Love, Geneseo, Ill.

[73] Assignee: Deere & Company, Moline, Ill.

[21] Appl. No.: 851,002

[22] Filed: Apr. 11, 1986

[51] Int. Cl.[4] .......................................... F16H 11/06
[52] U.S. Cl. ........................................ 474/17; 474/19
[58] Field of Search ............... 474/8, 12, 17, 19, 20, 474/21, 69, 70, 71

[56] References Cited

U.S. PATENT DOCUMENTS

| | | |
|---|---|---|
| 2,283,392 | 5/1942 | Shadrick . |
| 2,896,460 | 7/1959 | Mitchell ................................ 474/21 |
| 3,771,377 | 11/1973 | Bush ..................................... 474/17 |
| 3,881,370 | 5/1975 | Vogelaar et al. . |
| 4,095,479 | 6/1978 | Lundberg ............................ 474/19 |
| 4,138,837 | 2/1979 | Love . |
| 4,173,155 | 11/1979 | Togami et al. . |
| 4,348,197 | 9/1982 | Oliver ................................... 474/17 |
| 4,534,748 | 8/1985 | Stieg et al. . |
| 4,605,386 | 8/1986 | Harris .................................. 474/17 |

FOREIGN PATENT DOCUMENTS

| | | | |
|---|---|---|---|
| 0083501 | 7/1983 | European Pat. Off. ............. | 474/17 |
| 1254730 | 1/1961 | France . | |
| 2144597 | 2/1973 | France . | |
| 2356852 | 1/1978 | France . | |
| 0097948 | 6/1982 | Japan ................................... | 474/20 |
| 0998796 | 2/1983 | U.S.S.R. .............................. | 474/17 |
| 1027454 | 7/1983 | U.S.S.R. .............................. | 474/17 |

Primary Examiner—Stephen J. Novosad
Assistant Examiner—William P. Neuder

[57] ABSTRACT

In the torque-responsive, variable effective diameter driven sheave assembly of a variable speed V-belt drive, the sheave halves are relatively axially movable but keyed or splined together so as to prevent relative rotation between them. Torque response is provided downstream in the drive train by arranging for relative rotational motion between drive elements such as the driven shaft (which carries the driven sheave) and an output sheave to generate axial movement of one of the sheave halves. In an alternative embodiment, relative rotational movement generating axial adjustment of the sheave half takes place between the driven sheave halves, moving rotationally as a unit, and the driven shaft.

16 Claims, 7 Drawing Figures

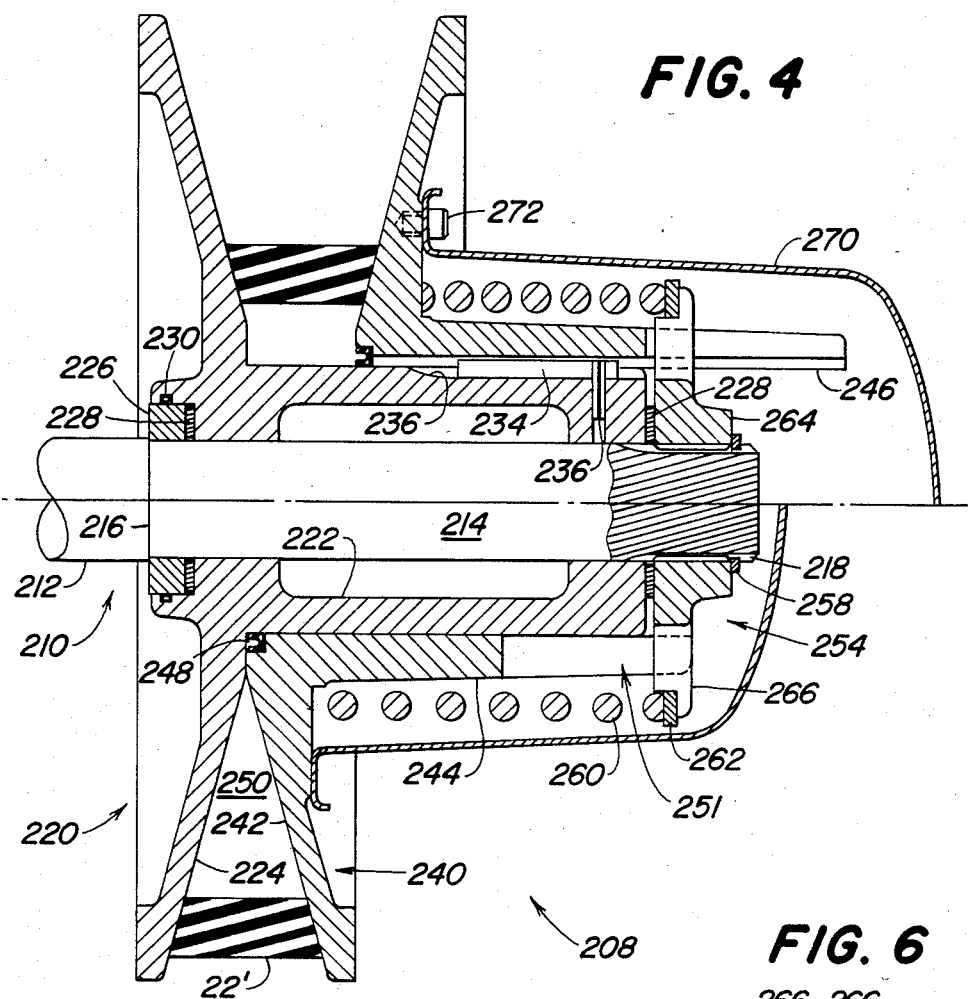
FIG. 4
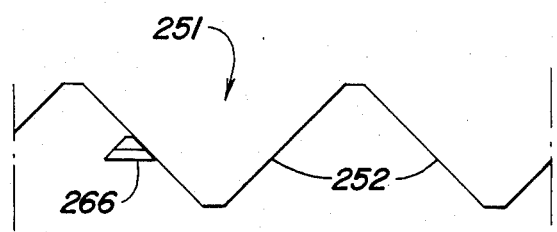
FIG. 5
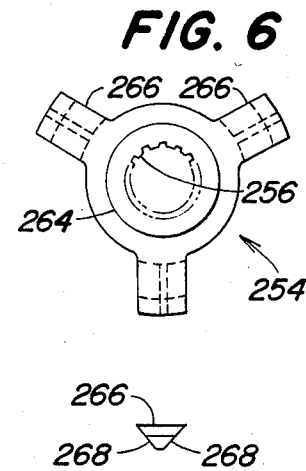
FIG. 6
FIG. 7

TORQUE-RESPONSIVE POWER TRANSMISSION ASSEMBLY

BACKGROUND OF THE INVENTION

This invention concerns power transmission devices in which a parameter of a drive element is automatically adjusted responsive to changes in torque transmitted and, more particularly, devices in which the parameter is the effective diameter of a sheave engageable by an endless power transmitting member such as a V-belt.

For convenience, it will be assumed in the following discussion that the input member of the power transmission device is the driven V-belt sheave of a variable speed V-belt drive of the type commonly used, for example, in harvesting machines in driving drop processing elements such as threshing cylinders or in the propulsion of the harvester. Typically, a hydraulic actuator is used to vary the spacing of the halves of a split driver sheave so as to vary effective diameter. The halves of the driven sheave are biased together so as to maintain suitable belt tension at an effective diameter reflecting the controlled adjustment of the drive sheave.

In variable speed V-belt drives, it is well known to make the driven sheave torque responsive (or torque sensing, as it is often called)—see for example U.S. Pat. Nos. 3,881,370 Vogelaar, 4,138,837 Love, and 4,348,197 Oliver. In a torque-responsive sheave, the biasing of the sheave halves together to maintain belt tension is usually a combination of passive spring loading and a camming action in the saxe direction resulting from relative rotational deflection between the two sheave halves under load.

The relative rotational deflection or movement between the sheave halves has always has an adverse effect on belt life and although this, broadly speaking, has been tolerated as a price to pay for the variable speed feature, the trend to bigger capacity mobile harvester machines has led to a demand for variable speed V-belt drives capable of transmitting high horsepower at moderate speeds and within the space constraints typical of mobile machines. Recent developments in V-belt construction have made possible some dramatic increases in drive power capacity, at least in standard fixed speed ratio drives. But, when these improved belt constructions have been used in variable speed drives with the conventional torque-responsive sheave depending on relative rotation between sheave halves, belt like has been disappointingly short. Features of the belt construction which help produce the higher power capacity in a straightforward drive make the belt relatively more susceptible to failure from the asymmetrical forces induced in it by the conventional torque-responsive sheave.

Torque-responsive sheave arrangements which do not depend on relative rotational movement between sheave halves would potentially improve belt life. It is already known to transduce electrically a sensed torque from somewhere in the drive train to control the sheave halves, perhaps through an hydraulic actuator while the sheave halves are held rotationally fixed, one to another. But such methods, at an adequate reliability level, are often not cost effective, especially in the competitive mobile harvester market.

SUMMARY OF THE INVENTION

Accordingly, it is an object of the invention to provide in a power transmission arrangement including a variable speed V-belt drive having a driven sheave whose effective diameter is automatically varied responsive to changes in torque transmitted, a mechanical torque-responsive driven sheave adjustment means which does not rely on relative rotation between two halves of that sheave.

According to one aspect of the invention, this objective may be realized in a power transmission assembly including a driven sheave having axially adjustable halves and constituting an input member and also having an output member and a drive train drivably connecting the input member to the output member, by providing a mechanical torque-responsive element in the drive train operable to urge the driven sheave halves together according to torque transmitted and also providing means for preventing relative rotation between the two halves of the driven sheave.

In one embodiment of the invention, the power transmission assembly is a countershaft assembly with the adjustable V-belt sheave being driven by an external power source and including an output member. Mechanical torque-responsive means, such as a camming device, are provided between the output member and the shaft of the countershaft assembly. Guide means, such as a spline, permit axial movement of one sheave half relative to the other while preventing relative rotation. And the output of the torque-responsive means is connected to one of the sheave halves so as to increasingly axially bias it towards an increase of effective sheave diameter as torque transmitted increases. A spring, coaxial or concentric with the countershaft, may be used to provide initial or theshold biasing of the sheave and tensioning of the belt to be supplemented in power transmission operation by the effect of the torque-responsive means. It is a feature of this embodiment that the output member may comprise a V-belt sheave assembly with a first larger diameter grooved portion, concentrically and removably surrounding a smaller diameter grooved portion which is also the hub of an element of the torque sensing means.

In a second embodiment, the adjustable halves of a driven sheave are journalled together on a drive shaft, connected together for relative axial displacement without relative rotational displacement. At least one of the sheave halves is axially displaceable relative to the shaft and is connected to the shaft through a torque-responsive element so that variations in torque transmitted from the sheave to the shaft result in variable axial displacement of the first sheave half. In a preferred camming arrangement, the axial displacement results from limited rotational displacement of the two sheave halves together on the shaft. As in the first embodiment, bias means, such as a compression spring, may be used to provide initial positioning and tensioning of the V-belt to be supplemented, in operation, as torque demands, by the action of the torque-responsive element.

BRIEF DESCRIPTION OF THE DRAWINGS

FIG. 4 is a view similar to FIG. 2 of an alternative embodiment of the invention.

FIG. 5 is a developed flat plan of the cam portion of a sheave half shown in FIG. 4.

FIG. 6 is a partial end view of the embodiment of FIG. 4 showing the cam plate.

FIG. 7 is an end view of one of the lobes of the cam plate of FIG. 6.

DESCRIPTION OF THE PREFERRED EMBODIMENT

Figure 1:
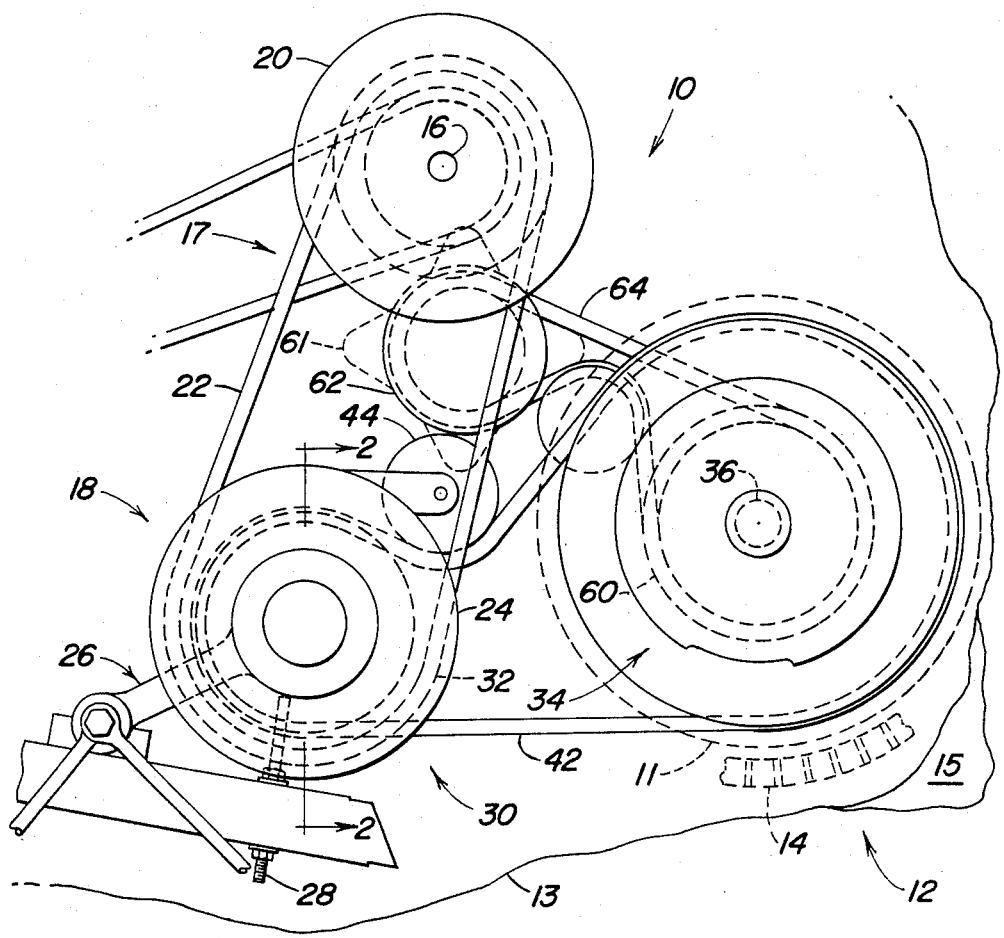
FIG. 1 is a semi-schematic partial right-hand side view of a forward portion of the separator body of a combine harvester showing the drive system for the combine threshing cylinder and including an embodiment of the invention. Some drive and structural elements have been omitted for clarity.

The invention is embodied in the drive system for the threshing cylinder of a conventional combine harvester shown only partially in FIG. 1. The drive system 10 and the threshing cylinder 11 (indicated in hidden outline only) are carried the forward end of the combine separator body 12 with the principal components of the drive system 10 adjacent to but outboard of the right-hand separator body wall 13. The threshing cylinder 11 and associated concave 14 extend between and are supported by the opposite right and left-hand body walls 13 and 15, respectively. The drive system 10 includes a primary countershaft 16 receiving power from the combine engine (not shown) and transmitting it by variable speed V-belt drive 17 to an intermediate countershaft assembly 18. (Other V-belt drives powered by the primary countershaft 16 are omitted, as are some structural details, to simplify the drawing.) The variable speed drive 17 may be conventional with the adjustable drive sheave 20 being hydraulically actuated (not shown). In operation, the center distance of the drive is fixed but the intermediate countershaft assembly 18 including driven pulley 24 is carried on a pivoted support arm assembly 26 which may be adjusted by means of draw bolt 28 to set center distance to compensate for length variations in drive belt 22 while still maintaining the designed speed range.

The final drive to the threshing cylinder 11 is by a fixed speed ratio multiple V-belt drive 30 comprising a drive sheave 32 included in the countershaft assembly 18 and directly driven from the pulley 24 and the sheave assembly 34 carried on the threshing cylinder shaft 36. A set of V-belts 42 trained around the sheave 32 and sheave assembly 34 transmits power between them. Belt tension in this fixed center drive is maintained by a conventional back side idler 44 controlled by a conventional tensioning device (not shown). A beater drive sheave 60 included in the sheave assembly 64 drives a beater feeder 61 (indicated in hidden outline only in FIG. 1) downstream of the threshing cylinder 11 through a driven sheave 62 and drive belt 24.

Turning now to details of the intermediate countershaft assembly 18, it is journalled in bearings 78 in the hub 76 of the arm assembly 26 whose arm 70 is pivoted to the body or frame of the combine by a pivot boss 72 and pivot pin 74. Directly journalled in the bearings 78 is the axially fixed sheave half 80 whose generally conical wall 82 forms a drive face 84. A suitably shouldered inner hub 86 seats the bearings 78 and a generally cylindrical outer hub 88 extends outwardly with respect to the drive face 84 and has an annular seal groove 90 near its outer end. The inner hub 86 carries an internal spline 92 extending over an intermediate portion of the internal bore 94. Inner and outer bearing bushings 96, 98 are pressed into the respective opposite ends of the bore 94. A retainer nut 100 threaded onto the inner hub 86 adjusts the bearings 78 and retains the sheave half 80 in position in the arm assembly 26. At the outer and inner ends respectively of the arm hub 76, a radial seal 192 and a face seal 104 protect the bearings 78.

The hollow shaft 110 has a short external spline 112 mating with the spline 92 of the sheave half 80 so that guided by the bearing bushings 96, 98, it can move axially but non-rotatably relative to the sheave half 80. The inner end of the shaft 110 extends beyond the arm hub 76 (and the sheave half inner hub 86) and is formed into a shallow angle external helical spline 114. The outer end of the shaft 110, contained at least partially within the outer hub 88 of the sheave half 80, contains a pair of axially extending notches or slots 116 and, in the remaining portion of its outer face 118, a series of concentric tapped holes 120.

At its inner end, adjacent the combine side sheet 13, the intermediate countershaft assembly 18 carries a composite dual speed range output sheave assembly 32. The inner smaller sheave 122 (for the lower cylinder speed range), has multiple grooves 124 for receiving the cylinder drive belt 42. The sheave's inner face 126 is normally in sealing contact with the face seal 104 and bearing contact with thrust washers 127, abutting the sheave inner hub 86. Its outer face 128 carries a series of tapped holes 130. An internal helix 132 mates with the external helix 114 of the shaft 110. The larger outer sheave 134 (for a higher cylinder speed range) has grooves 136 concentrically aligned with the grooves 124 of the smaller sheave. An annular adaptive shoulder 138 and cap screws 140 connect the inner and outer sheaves 122, 134. At the regular (higher) cylinder speed, the smaller sheave 122 serves as a hub for the sheave 134 thus having a dual function.

A helical compression spring 150 is housed in the axial through bore 152 of the shaft 110 with its inner end seated on a retainer washer 154 against a snap ring 156. Threaded through the spring 150 and retainer washer 154 is a tie bolt having a threaded stop shoulder 160 at its inner end and a long threaded portion 162 at its outer end permitting an adjusting nut 164 to be run down against a second retaining washer 166 to adjust and contain the spring 150 between the respective washers 154, 166. The tie bolt 158 is fixed axially within the assembly through, at the inner end, a lubricant retaining cap 170 pressed into the inner sheave 122 and reatined on the stop shoulder 160 by a nut 172 and, at its outer end, by a bridge piece 174 bearing against the fixed sheave half outer hub 88 and retained by a third nut 176 bearing against a thrust washer 178.

The axially movable sheave half 180 is concentrically mounted on the shaft outer face 118 by a series of cap screws 182. Its conical wall 184 presents a drive face 186 to the corresponding drive face 184 of the axially fixed sheave half 80 defining a deep variable V-belt groove 188. The hollow hub 190 of the sheave half substantially surrounds and covers the outer hub 88 of the mating sheave half but a central hole 192 provided with a removable cover plate 194 provides access to the tie bolt 158 and its retaining nut 176. An axial running seal assembly 198 is anchored at its opposite ends to the sheave half outer hub 88, at groove 90, and to the shaft 110 adjacent its outer end, respectively, thus providing for relative axial motion between these components while substantially shielding and sealing entry to the outer end of the shaft bore 152.

Figure 2:
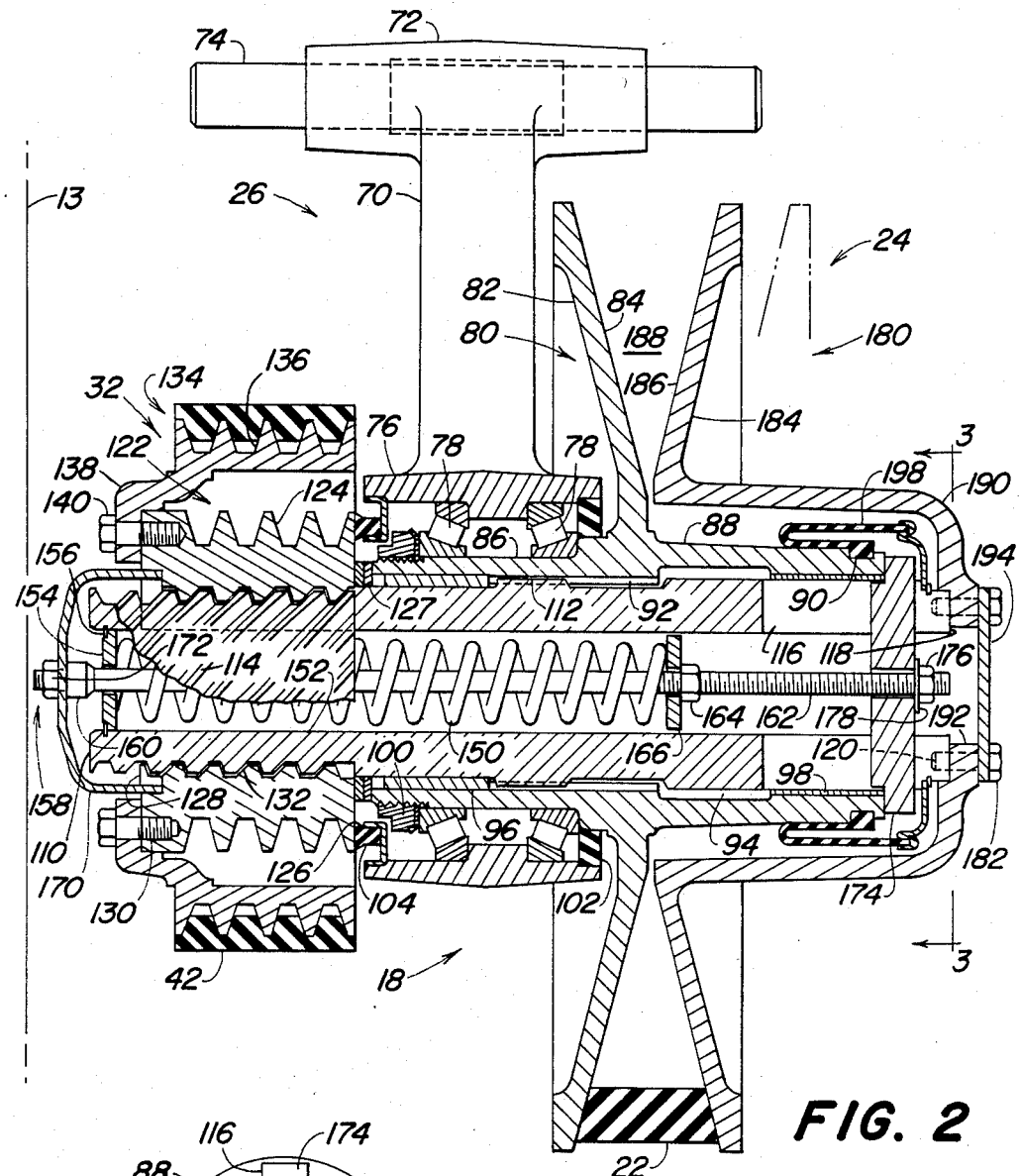
FIG. 2 is an enlarged partial cross-sectional view taken approximately on line 2—2 of FIG. 1 showing details of the countershaft assembly embodying the invention.
Figure 3:
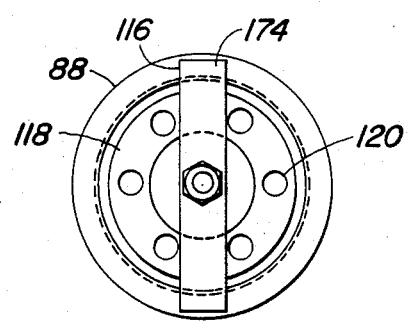
FIG. 3 is a partial end view taken on line 3—3 of FIG. 2, with the outer sheave removed.

In preparation for operation, with the intermediate countershaft assembly 18 assembled to the combine, the actuator controlled drive sheave 20 of the variable speed drive suitably adjusted, and with the belt 22 installed, draw bolt 28 is adjusted to extablish an initial predetermined tension in the belt and position of the belt in the V-belt groove 188 of the torque-responsive sheave assembly, such as the exemplary maximum effective diameter condition (fully closed) shown in FIG. 2. In this adjustment procedure, sheave halves 80, 180 are forced apart, sliding the shaft 110 axially outwards against the resistance of spring 150.

In power transmitting operation, the torque required to drive the cylinder 11 is sensed between the output sheave 32 and the helical guide portion 114 of the shaft 110. The direction of the helix is such that response to the sensed torque is to draw the shaft and hence the movable sheave 180 axially inwards, supplementing the action of the spring 150. In terms of V-belt drive function, the torque response, in reducing the gap between the sheave halve 80, 180 is to increase effective diameter causing the belt 22 to ride at a greater diameter in the sheave and increasing belt tension. Because the sheave halves 80 and 180 are tied together by the spline 112, this torque responsive action is achieved without any potentially belt damaging relative rotational motion between the sheave halves.

FIGS. 4-6 illustrate a second embodiment of the invention. Both embodiments provide a torque-responsive adjustable driven sheave in which the torque sensing and responding occurs downstream of the sheave. But, whereas, in the first embodiment, the response depends on relative rotational movement between the driven shaft and an output sheave, in the second embodiment, it occurs between the driven input sheave and the shaft.

FIG. 4 shows the driven adjustable sheave and torque sensing and responsive elements with the view split on the rotational axis of the device, showing the extremes of sheave adjustment—the closed, low speed position in the lower half of the drawing and the open high speed position in the upper half of the drawing. Only a portion of the driven shaft 210 is shown and it is assumed to be suitably journalled by a journal portion 212 and to be driving an unseen machine element such that the shaft is subject to varying torsional load.

The sheave assembly 208 is carried on an input portion 214 of the shaft which is partly defined by shoulder 216, adjacent the journal portion 212, and which carries a straight axial spline 218 at its free or outer end. The axially fixed or restricted sheave half 220 is free to rotate on the shaft input portion 214 by the journalling of an axially extending hub 222. It presents a conventional conical drive face 224 to the drive belt 22'. The inner end of the sheave hub 222 is located axially by a collar 226 and thrust bearing 228. A seal 230 protects the bearing surfaces. At the outer end of the sheave hub 222, a keyway 232 carries a conventional square key 234 held in position by a pin 236.

The mating axially adjustable sheave half 240, with its mating drive face 242 is carried on the axially fixed sheave half 220 by an axially extending hub 244 and guided by a keyway 246 engaging the key 234 and preventing relative rotational movement between the sheave halves 220, 240. A seal 248 at the base of the V-groove 250 defined by the opposing drive faces 224, 242 protects the hub sliding surfaces.

The outer end of the hub 244 is a cam portion 251 which is serrated or notched in the form best seen in FIG. 5, to provide a series of cam surfaces 252. A cam washer 254 with a splined bore 256 mating with the spline 218 of the driven shaft is spaced from the end of the hub 222 of the axially fixed sheave half 208 by a second thrust washer or bearing 228. It is retained on the shaft by a snap ring 258, and in its turn, retains a compression spring 260 carries concentrically by the movable sheave hub 244, assisted by a spring retaining washer 262. The form of the cam washer 254 seen best in FIGS. 6 and 7 is that of a splined hub 264 with three radially extending, equally spaced cam lobes 266 of triangular cross-section, the lobes being symmetrical and presenting cam working surfaces 268 engaging the cam surfaces 252 of the axially adjustable sheave half 240. (Note that cam action is in the same sense for both directions of rotation so that belt tension is maintained in case the driven components overrun the power source, when decelerating for example). A protective cap 270 secured by a retaining screw 272 completes the sealing of the working surfaces of the torque-responsive sheave assembly.

The initial adjustment and operation under load of this second embodiment is similar to that described for the first. The effect of the camming action between the engaged surfaces 252, 268 is to urge the movable sheave 240 towards the fixed half 220 tending to increase belt tension and more efficiently transmit a higher torque. Relative rotation takes place only between the sheave halves (tied together by the key 234) and the shaft input portion 214 and not between the sheave halves themselves.

I claim:

1. A variable speed V-belt drive in which the V-groove of a driven sheave assembly is defined by cooperating first and second sheave elements, axially adjustable one with respect to the other so as to vary the width of the V-groove and hence the effective diameter of the sheave, characterized in that:

the driven sheave assembly includes means for preventing relative rotation between the first and second sheave elements;

the driven sheave assembly transmits power through a drive train comprising a plurality of transmission members including an output member, drivably engaged in sequence;

the drive train includes torque-responsive means effective between at least one pair of the transmission members, at least one of the pair being axially deflectable responsive to torque sensed during power transmitting operation, to urge the at least one transmission member axially; and in that it includes means connecting the at least one transmission member to the first sheave element so that said sheave element is deflected axially responsive to changes in torque during power transmission operation.

2. The variable speed drive of claim 1 wherein the drive train includes a shaft and the torque-responsive means includes cam means effective between the output member and the shaft.

3. The variable speed drive of claim 2 wherein the first sheave element is connected to the shaft and the shaft is axially deflectable.

4. A countershaft assembly for power transmission comprising:
a shaft;

a variable effective diameter V-belt sheave comprising two sheave halves with at least one sheave half free to move axially relative to the other half, mounted non-rotatably on the shaft;

means for preventing relative rotation between the two sheave halves;

an output member carried by and rotationally displaceable on the shaft; and torque-responsive means effective between the output member and the shaft, said means having a torque-responsive output element connected to the axially adjustable sheave half for adjusting said sheave axially, responsive to relative rotational displacement between the shaft and the output member.

5. The countershaft assembly of claim 4 wherein the output of the torque-responsive means is the shaft and the adjustable sheave half is rigidly connected to the shaft.

6. The countershaft assembly of claim 4 and further including bias means additional to the torque-responsive means for biasing the sheave halves in the direction of increasing effective diameter.

7. A power transmission assembly journalled in a support comprising:

a shaft journalled in the support:

a variable effective diameter V-belt sheave carried by the shaft including a first sheave half non-rotatable but axially slidable with respect to the shaft and a second sheave half carried in fixed relation to the shaft, the two sheave halves cooperating to define a variable width V-belt groove;

an output element concentrically carried by the shaft for at least partial rotation with respect to the shaft; and so that in power transmission operation, tending to rotate the shaft relative to the output element, the cam means responds by converting said relative rotation into relative axial movement so that the second sheave half, in fixed relation to the shaft, is urged towards the first sheave half in the direction of increasing sheave effective diameter.

8. The power transmission assembly of claim 7 wherein the first sheave half includes a hub extension concentric with the shaft and journalled in the support and wherein the second sheave half is rigidly connected to the shaft and the shaft is axially adjustable with respect to the first sheave half.

9. The power transmission assembly of claim 8 and further including means for biasing the second sheave half towards the first sheave half, independent of the torque-responsive means.

10. The power transmission assembly of claim 9 wherein the bias means is a spring having a first end in a fixed relation to the support and an opposite second end connected to the shaft.

11. The power transmission assembly of claim 10 wherein the shaft is hollow and the spring extends internally of the shaft.

12. The power transmission assembly of claim 11 wherein the spring is a compression spring.

13. The power transmission assembly of claim 7 wherein the output member is carried concentrically by the shaft and the output member and the shaft respectively have cooperating internal and external helical guide surfaces so that relative rotation between them causes relative axial displacement.

14. The power transmission assembly of claim 13 wherein the output member is restrained axially with respect to the support so that relative rotation between output member and shaft displaces the shaft axially with respect to the support.

15. The power transmission assembly of claim 7 wherein the shaft extends through the support and the variable effective diameter sheave and the output element are disposed on opposite sides of the support.

16. The power transmission assembly of claim 7 wherein the output element is a second V-belt sheave.

* * * * *

UNITED STATES PATENT AND TRADEMARK OFFICE
CERTIFICATE OF CORRECTION

PATENT NO. : 4,689,036

DATED : 25 August 1987

INVENTOR(S) : Mahlon L. Love

It is certified that error appears in the above-identified patent and that said Letters Patent is hereby corrected as shown below:

Column 7, line 35, after "and" begin a new paragraph and insert --cam means effective between the output element and the shaft--.

Signed and Sealed this

Fifteenth Day of March, 1988

*Attest:*

DONALD J. QUIGG

*Attesting Officer*   *Commissioner of Patents and Trademarks*